(12) United States Patent
Jurik et al.

(10) Patent No.: US 6,394,494 B1
(45) Date of Patent: May 28, 2002

(54) STEERING COLUMN HAVING A MAGNESIUM UPPER MOUNTING BRACKET RELEASE BREAK-AWAY BAR

(75) Inventors: Mirjana Jurik, Rochester Hills, MI (US); Jeff Szyskowski, Toledo, OH (US); Thomas Dziegielewski, Rochester Hills, MI (US); John M Stoiber, Oregon, OH (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/665,967

(22) Filed: Sep. 20, 2000

(51) Int. Cl.⁷ .................................................. B62D 1/18
(52) U.S. Cl. .......................................... 280/777; 74/492
(58) Field of Search ................................ 280/777, 775; 74/492; 248/548, 909

(56) References Cited

U.S. PATENT DOCUMENTS

| | | | | |
|---|---|---|---|---|
| 4,194,411 A | * | 3/1980 | Manabe et al. | 74/492 |
| 4,786,076 A | * | 11/1988 | Wierschem | 280/777 |
| 4,949,992 A | * | 8/1990 | Abramczyk | 280/777 |
| 5,056,818 A | * | 10/1991 | Sadakata | 280/777 |
| 5,390,955 A | | 2/1995 | Kaliszewski et al. | |
| 5,788,279 A | * | 8/1998 | Pfannebecker | 280/707 |
| 6,176,151 B1 | * | 1/2001 | Cymbal | 74/492 |
| 6,193,267 B1 | * | 2/2001 | Tichvon et al. | 280/728.2 |

* cited by examiner

Primary Examiner—J. J. Swann
Assistant Examiner—David R. Dunn
(74) Attorney, Agent, or Firm—Mark P. Calcaterra

(57) ABSTRACT

A steering column mounting bracket is provided with break-away bars integrally formed therewith to allow for a consistent break-away force and reduce noise in the cabin of an automobile. The break-away bars will allow for axial compression of the steering shaft during an accident involving a collision of an automobile.

4 Claims, 4 Drawing Sheets

STEERING COLUMN HAVING A MAGNESIUM UPPER MOUNTING BRACKET RELEASE BREAK-AWAY BAR

FIELD OF THE INVENTION

The present invention relates generally to steering column support structures, and more particularly to a steering column support structure including break-away bars that securely hold the steering column to the instrument panel without hindering the collapse of the steering column during an accident.

BACKGROUND

It is desirable to have a steering column of a vehicle that is securely attached to the frame of the automobile so as to ensure safe operation thereof for the life of the automobile. Generally, this is accomplished by bolting the steering column to the instrument panel which is further secured to the frame of the automobile. However, it is further desirous to allow for the steering column to disengage from the instrument panel upon the application of a force during an accident.

It is known in the art to attempt to solve these contradictory goals by using polymer capsules to support the mounting bracket (such as disclosed in commonly assigned U.S. Pat. No. 5,390,955 herein incorporated by reference) and the steering column that are designed in such a way as to break away under a given force. Thus, the steering column is allowed to break away from the instrument panel upon the application of a force in the event on an accident.

Further, the polymer capsules may fall out during installation and may change in shape which can cause the capsules to weaken or "creep." This creep can cause buzz/squeak/rattle (BSR) problems which are unwanted during the operation of the vehicle. Furthermore, the polymer capsules are relatively fragile and can become damaged prior to installation thus requiring the disposal of the part.

SUMMARY OF THE INVENTION

The present invention provides a break-away bar that will overcome the disadvantages of the prior art polymer capsules. It is an object of this invention to form these break-away bars from the same material as the remainder of the steering column mounting bracket. The magnesium or other metallic material of which the steering column mounting bracket is made is rigid and is not susceptible to being misshapen and is much more predictable than a polymeric material. Thus, the break-away bar will have a consistent break-away load, not be susceptible to BSR, and not break unintentionally during installation.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
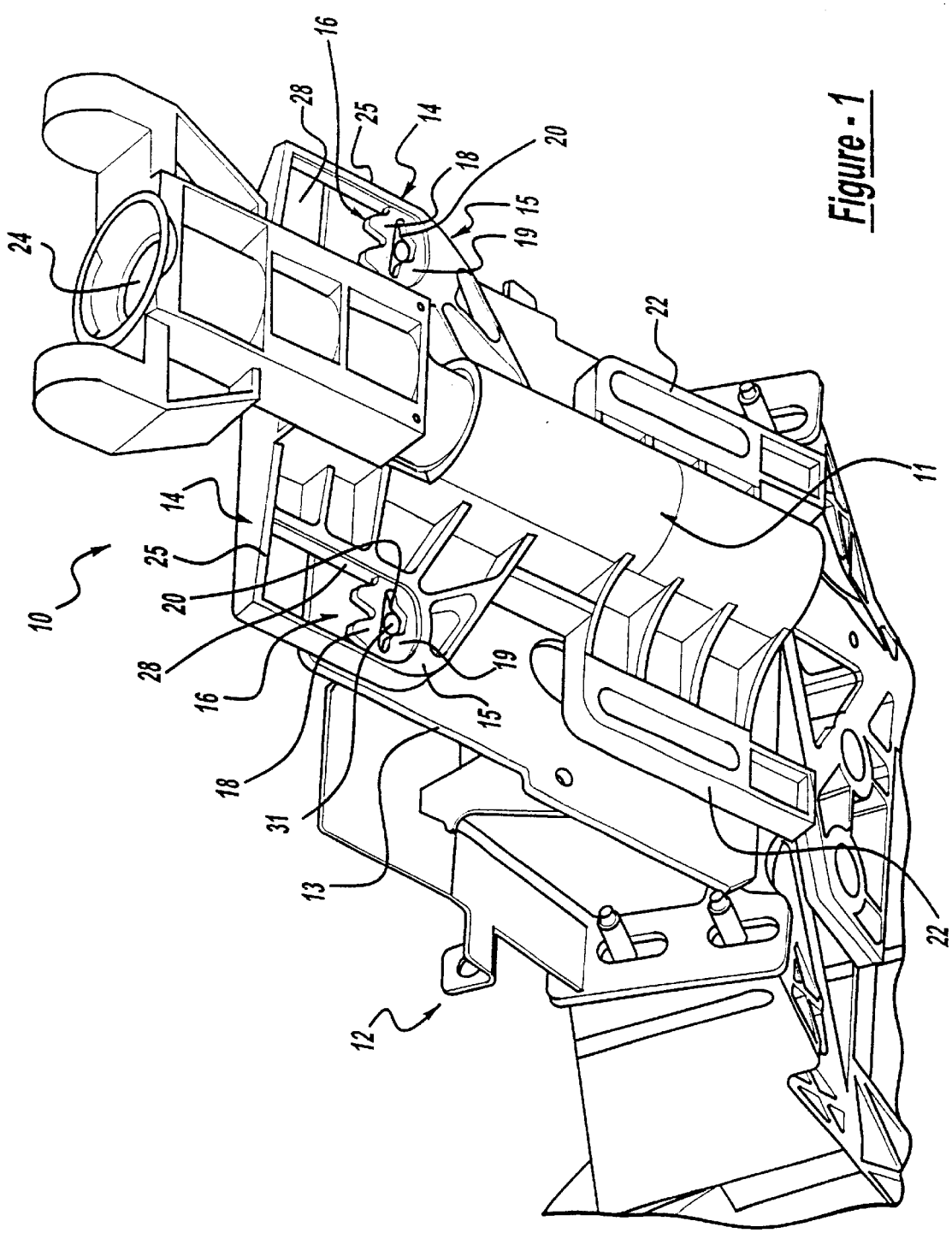
FIG. 1 is a perspective view illustrating the attachment of the steering column mounting bracket to the instrument panel.

FIG. 1 illustrates the mounting bracket 10 in its assembled orientation with the support bracket 13 and the instrument panel 12. However, for illustrative purposes, FIG. 1 does not include the fasteners affixing the mounting bracket 10 to the support bracket 13. Such fasteners 30, 32 are shown in place, in detail, in FIGS. 2 and 2a as will be described in greater detail herein.

Referring to FIG. 1 the mounting bracket 10 includes a main body 11 through which a bore 24 is defined for receiving a steering shaft (not shown). On either side of the main body 11 are a pair of rearward flanges 14 and a pair of forward flanges 22. The pair of rearward flanges 14 include a lower flange body 15 and an upper flange structure 25 which define openings 28. Openings 28 allow for limited movement of mounting bracket 10 relative to support bracket 13. Break-away assemblies 16 are contained within the openings 28. The break-away assemblies 16 include a break-away bar 18 interconnected to the inside of the openings 28. The geometry of the break-away bar 18 may be altered to provide a selected force under which the break-away bar 18 will release. The break-away assembly 16 further includes a web body 19. Together break-away bar 18 and web body 19 define a fastener opening 20. The fastener opening 20 allows for the insertion of fasteners to affix the mounting bracket 10 to the support bracket 13.

Figures 2, 2A:
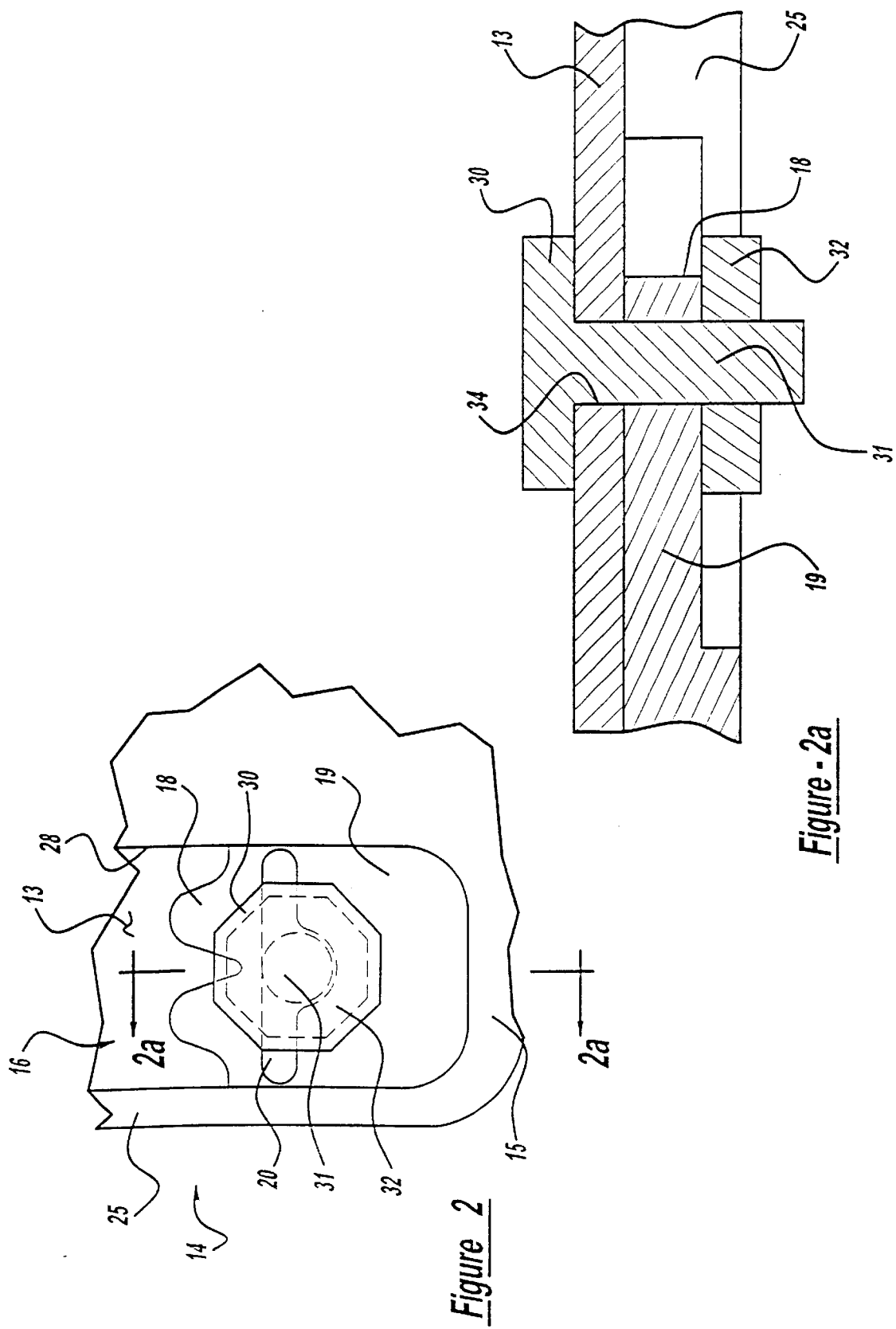
FIG. 2 is a detail view of the break-away bar of the mounting bracket is affixed to a support bracket of the instrument panel.
FIG. 2a is a cross-sectional view taken along line 2a—2a of FIG. 2.

FIG. 2 is a detail view of a flange 14 of the mounting bracket 10 affixed to the support bracket 13. Break-away bar 18 and web body 19 are inside openings 28 of the flange 14. A bolt 30 is inserted through an opening 34 in the support bracket 13 and opening 20 in the break-away bar assembly 16. The bolt 30 is then secured into place with a nut 32. The head of the bolt 30 is disposed against support bracket 13 and nut 32 is disposed against break-away bar 18 and web body 19. Through this interlocking the mounting bracket flange 14 is affixed to the support bracket 13 through break-away bar 18 and web body 19.

FIG. 2a is a cross-sectional view of the same detail as shown in FIG. 2. Flange 14 includes the flange body 15 and the upper flange structure 25 which define openings 28. The flange 14 further includes the break-away bar assembly 16 which includes the break-away bar 18 and web body 19. The fastener opening 20 is defined by break-away bar 18 and web body 19. In this view the head of bolt 30 is disposed against support bracket 13 while bolt shaft 31 extends through fastener opening 20 in mounting bracket 10. Nut 32 engages the bolt shaft 31 and is disposed against break-away bar 18 and web body 19.

Figure 3:
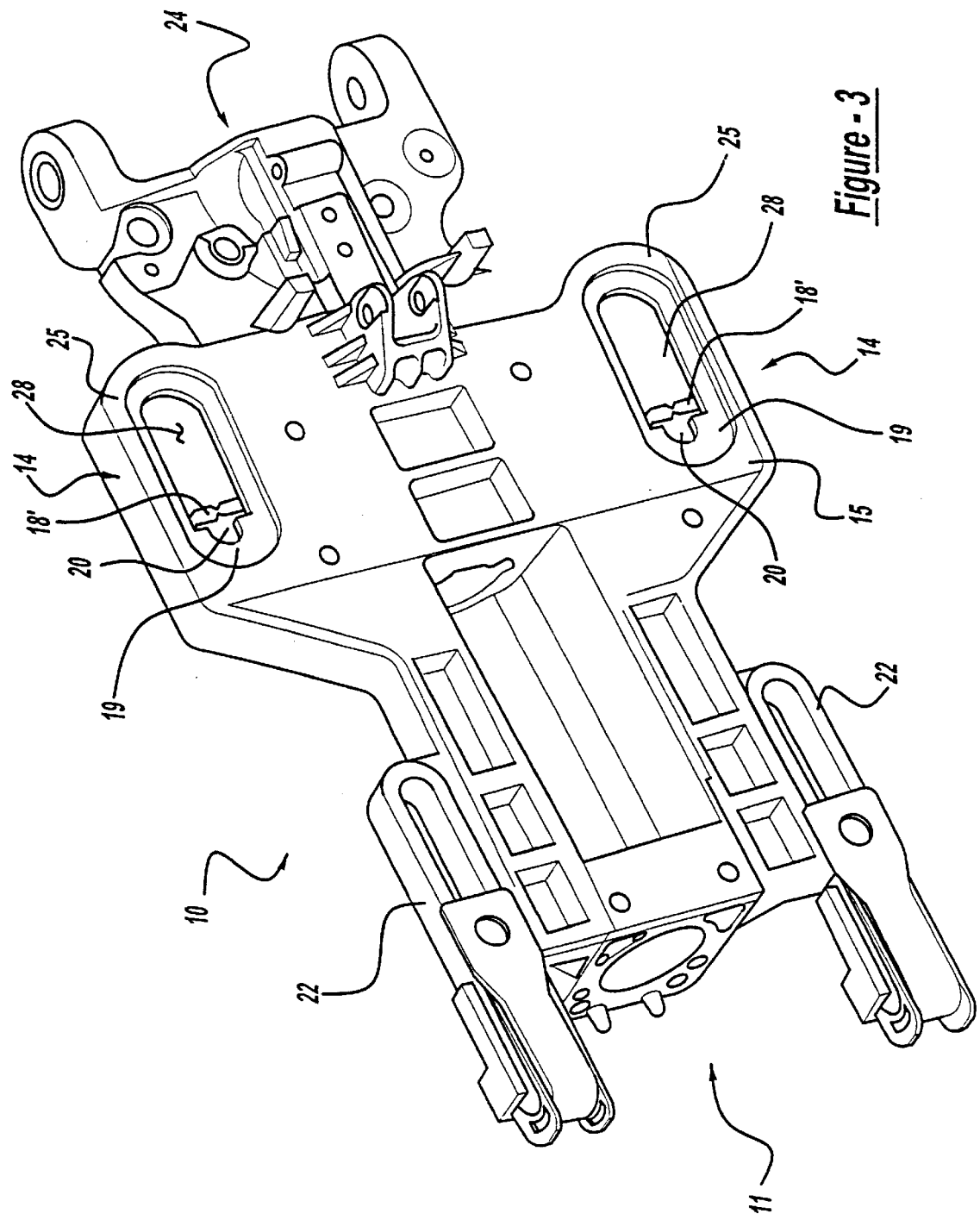
FIG. 3 is a perspective view of a mounting bracket containing four mounting areas with a first embodiment of the invention.

FIG. 3 illustrates a perspective view from the front side of mounting bracket 10. The mounting bracket 10 includes a main body 11 and a bore 24 through which a steering shaft (not shown) may be inserted. Formed to the sides of the main body 11 are flanges. Included in this embodiment are forward flanges 22 and rearward flanges 14 placed on opposite sides of main body 11. Rearward flanges 14 include an upper flange structure 25 defining an opening 28. Upper flange structure 25 provides a limit to the movement allowed of the mounting bracket 10. Contained within the opening 28 of the rearward flanges 14 are break-away bar assemblies 16. In this embodiment, break-away bar 18 has a different geometry of that shown in FIGS. 1 and 2 (in order to illustrate alternative designs). The break-away bar geometry can be generally described as a uniform bar, pinched in its center and distal ends, the distal ends of the break-away bar 18' are affixed to the interior of the flange 14. The geometry of the break-away bar 18' may be altered to alter the force required to release its hold. When the break-away bar 18' is broken the mounting bracket 10 is free to move along its axis.

Figure 4:
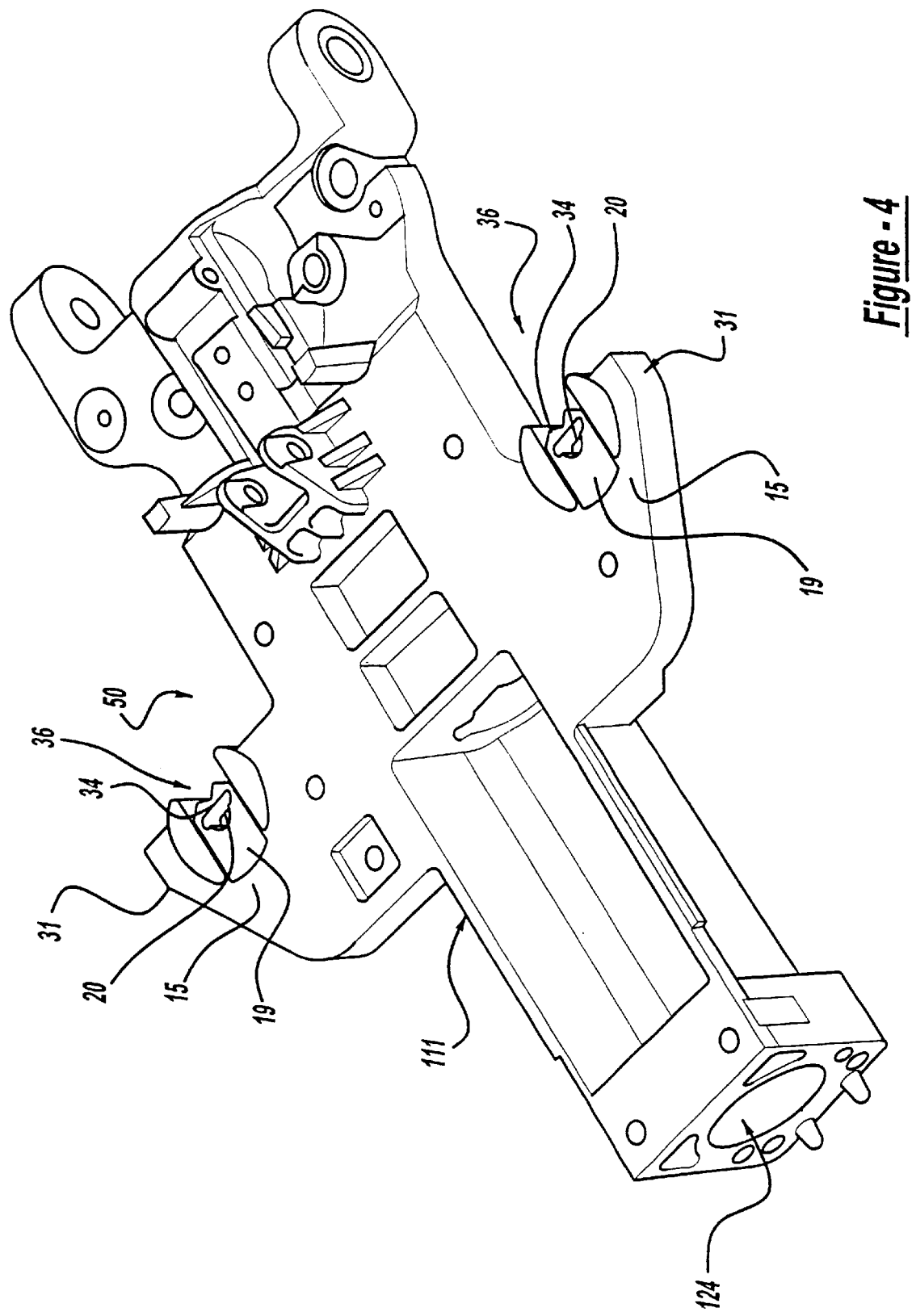
FIG. 4 is a perspective view of a mounting bracket containing two mounting areas with a second embodiment of the invention.

Illustrated in FIG. 4 is a second embodiment of the present invention wherein like reference numerals designate similar elements. The mounting bracket 50 of this embodiment includes a main body 111 including a bore 124 through the main body 111 to receive a steering shaft (not shown) when fully assembled. However, this embodiment includes only rearward flanges 31 and eliminates the upper flange structures 25 of FIG. 3. Further, the break-away bar 34 of the break-away bar assembly 36 is demonstrated with an altered geometry from that disclosed in FIG. 3. In addition, due to the lack of upper flange structure in this embodiment the mounting bracket 50 is not hindered in its movement once the break-away bars 34 release.

Continuing reference to FIGS. 3 and 4 it can be seen that features from the two embodiments may be interchanged creating several variations (two are illustrated). Thus, for example, the break-away bar 18 of FIG. 3 may be placed in the mounting bracket 50 of FIG. 4. In a second example the upper flange structure 25, as in FIG. 3, may be placed around the break-away bar 34 of FIG. 4 and the upper flange structure 25 of the embodiment of FIG. 3 may be removed as in FIG. 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for mounting a steering column to a frame of an automobile that allows for release of the steering column upon application of a certain force comprising:

a support structure for attachment to a frame of an automobile, the support structure having a portion with a first opening and a second opening;

a steering column mounting bracket having:
a main body portion with a central bore for receiving a steering shaft; and
a first flange and a second flange spaced on opposite sides of said main body portion, said first flange having a portion with a first flange opening and said second flange having a portion with a second flange opening;

an integrally formed break away bar formed within the first flange opening to define a first fastener opening and an integrally formed break away bar formed within the second flange opening to define a second fastener opening, the first fastener and second fastener opening aligning with the first and second opening of the support structure;

a first fastener through said first opening and said first fastener opening and a second fastener through said second opening and said second fastener opening; and wherein each of said break-away bars is positioned to maintain the mounting bracket in a fixed position, and each of said break-away bars is formed with a geometry along its length so as to maintain the mounting bracket in a fixed position until rupture of each break-away bar at a desired force.

2. The apparatus of claim 1, wherein said mounting bracket and said break-away bars are made of the same metal.

3. The apparatus of claim 2, wherein said break-away bars are molded as one piece with said mounting bracket.

4. The apparatus of claim 3, wherein said break-away bars and said mounting bracket are made of magnesium.

* * * * *